United States Patent [19]
Wong

[11] Patent Number: 5,561,751
[45] Date of Patent: Oct. 1, 1996

[54] SYSTEM AND METHOD FOR DISPLAYING A COLOR IMAGE USING VECTOR ERROR DIFFUSION

[75] Inventor: Peter W. Wong, Redmond, Wash.

[73] Assignee: Microsoft Corporation, Redmond, Wash.

[21] Appl. No.: 354,515

[22] Filed: Dec. 13, 1994

[51] Int. Cl.⁶ ................................................... G06T 11/00
[52] U.S. Cl. .......................................... 395/131; 358/456
[58] Field of Search ................................... 395/131, 129, 395/130, 132, 141, 126, 127; 358/500, 505, 515–523, 525, 456–461

[56] References Cited

U.S. PATENT DOCUMENTS 5,070,413  12/1991  Sullivan et al. ........................ 358/456

OTHER PUBLICATIONS

Floyd et al., "An Adaptive Algorithm for Spatial Grey Scale," 1975 SID International Symposium, Digest of Technical Papers, Lewis Winner, New York, NY 1975, pp. 36–37.
Wyszecki, Günther et al., *Color Science, Concepts and Methods, Quantitative Data and Formulae*, 2d ed., John Wiley & Sons, New York, NY, 1982, pp. 243–248.
Ulichney, Robert, *Digital Halftoning*, The MIT Press, Cambridge, MA, 1987, pp. 239–264 and 340–342.
Hall, Roy, *Illumination and Color in Computer Generated Imagery*, Springer–Verlag, New York, NY, 1989, pp. 125–134.
Foley, James D. et al., *Computer Graphics, Principles and Practice*, 2d ed. Addison–Wesley Publishing Company, Reading, MA, 1990, pp. 563–604.
Sullivan et al., "Image halftoning using a visual model in error diffusion," *J. Opt. Soc. Am.* 10(8):1714–1724, 1993.

Primary Examiner—Almis R. Jankus
Attorney, Agent, or Firm—Seed and Berry LLP

[57] ABSTRACT

A method and system for displaying a color image with a display device using vector error diffusion. Each pixel of the color image is represented by an active color vector, which typically, but not necessarily, is an RGB (red, green, blue) triplet. Often, the display device cannot display the exact color vector desired, so it displays the closest active color to the desired color, thereby resulting in an error vector for each pixel. The method computes the error vector by vector subtracting a color vector representing the active color displayed from the color vector of the desired color. The computed error vector is diffused to adjacent pixels by adjusting the color vectors of the adjacent pixels by fractions of the computed error value. Preferably, the method characterizes each color that can be displayed on the display device by measuring the color directly using a colorimeter which eliminates errors caused by non-linear combinations of the color coordinates of the color vectors. Preferably, the method also adjusts the desired color vector for each pixel to compensate for color bleeding between pixels.

31 Claims, 7 Drawing Sheets

Figure 3 - Active Color Table

| Active Color | RGB Color Vector | IBGR Color Vector |
|---|---|---|
| Black | 0,0,0 | 0000 |
| Dark Red | 100,0,0 | 0001 |
| Dark Green | 0,80,0 | 0010 |
| Dark Yellow | 96,78,0 | 0011 |
| Dark Blue | 0,0,110 | 0100 |
| Dark Magenta | 98,0,107 | 0101 |
| Dark Cyan | 0,77,106 | 0110 |
| Grey | 97,76,108 | 0111 |
| Black | 0,0,0 | 1000 |
| Red | 200,0,0 | 1001 |
| Green | 0,160,0 | 1010 |
| Yellow | 198,156,0 | 1011 |
| Blue | 0,0,220 | 1100 |
| Magenta | 197,0,218 | 1101 |
| Cyan | 0,158,216 | 1110 |
| White | 199,157,215 | 1111 |

Figure 5 - Input Image Array

|   | 1 | 2 | 3 |
|---|---|---|---|
| A | 48,120,85 | 55,87,65 | 30,150,50 |
| B | 40,100,105 | 33,66,140 | 0,80,175 |
| C | 50,120,62 | 72,105,48 | 50,80,48 |

Figure 6 - Output Image Array

|   | 1 | 2 | 3 |
|---|---|---|---|
| A | 0,77,106(d. cyan) | 97,76,108(grey) | 0,160,0(green) |
| B | 97,76,108(grey) | 0,77,106(d. cyan) | 0,158,216(cyan) |
| C | 0,160,0(green) | 97,76,108(grey) | 96,78,0(d. yellow) |

Figure 4A - Color Bleeding Table (Part A)

| | Black | Dark Red | Dark Green | Dark Yellow | Dark Blue | Dark Magenta | Dark Cyan | Grey |
|---|---|---|---|---|---|---|---|---|
| Black | 0,0,0 | 1,0,0 | 0,2,0 | 1,1,0 | 0,0,1 | 1,0,1 | 0,1,1 | 1,1,1 |
| Dark Red | -1,0,0 | 0,0,0 | -1,3,0 | 0,1,0 | -1,0,1 | 0,0,1 | -1,1,1 | 0,1,1 |
| Dark Green | 0,-2,0 | 2,-1,0 | 0,0,0 | 1,0,0 | 0,-1,1 | 1,-1,1 | 0,0,1 | 1,0,1 |
| Dark Yellow | -1,-2,0 | 2,-1,0 | -1,4,0 | 0,0,0 | -1,-1,1 | 0,-1,1 | -1,0,1 | 0,0,1 |
| Dark Blue | 0,0,-1 | 2,0,-1 | 0,3,-1 | 1,1,-1 | 0,0,0 | 1,0,0 | 0,1,0 | 1,1,0 |
| Dark Magenta | -2,0,-1 | 2,0,-1 | -1,4,-2 | 0,1,-1 | -1,0,0 | 0,0,0 | -1,1,0 | 0,1,0 |
| Dark Cyan | 0,-2,-2 | 2,-1,-1 | 0,3,-1 | 1,0,-1 | 0,-1,0 | 1,-1,0 | 0,0,0 | 1,0,0 |
| Grey | -1,-2,-1 | 3,-1,-1 | -1,3,0 | 0,0,-1 | -1,-1,0 | 0,-1,0 | -1,0,0 | 0,0,0 |
| Red | -3,0,0 | -3,0,0 | -2,4,0 | -1,1,0 | -3,0,1 | -1,0,1 | -2,1,1 | -1,1,1 |
| Green | 0,-3,0 | 3,-2,0 | 0,3,0 | 2,0,0 | 0,-2,1 | 1,-2,1 | 0,-1,1 | 1,-1,1 |
| Yellow | -3,-3,0 | 3,-1,0 | -2,4,0 | -1,0,0 | -2,-2,1 | -1,-2,1 | -2,-1,1 | -1,-1,1 |
| Blue | 0,0,-2 | 4,0,-1 | 0,3,-2 | 1,1,-2 | 0,0,-1 | 1,0,-1 | 0,1,-1 | 1,1,-1 |
| Magenta | -3,0,-2 | 3,0,0 | -1,3,-2 | -1,1,-2 | -2,0,-1 | -1,0,-1 | -2,1,-1 | -1,1,-1 |
| Cyan | 0,-3,-2 | 4,-1,-2 | 0,4,-1 | 1,-1,-2 | 0,-2,-1 | 1,-2,-1 | 0,-1,-1 | 1,-1,-1 |
| White | -3,-3,-3 | -1,-2,-1 | -3,-1,-2 | -1,-1,-3 | -3,-2,-1 | -1,-2,-1 | -2,-1,-1 | -1,-1,-1 |

Figure 4B - Color Bleeding Table (Part B)

| | Red | Green | Yellow | Blue | Magenta | Cyan | White |
|---|---|---|---|---|---|---|---|
| Black | 2,0,0 | 0,2,0 | 2,2,0 | 0,0,2 | 2,0,2 | 0,2,2 | 3,3,4 |
| Dark Red | 1,0,0 | -1,2,0 | 0,2,0 | -1,0,2 | 1,0,2 | -1,2,2 | 1,2,2 |
| Dark Green | 2,-1,0 | 0,1,0 | 2,1,0 | 0,-1,2 | 2,-1,2 | 0,1,2 | 2,1,3 |
| Dark Yellow | 1,-1,0 | -1,1,0 | 1,1,0 | -1,-1,2 | 1,-1,2 | -1,1,3 | 2,2,4 |
| Dark Blue | 2,0,-1 | 0,2,-1 | 2,2,-1 | 0,0,1 | 2,0,1 | 0,2,0 | 3,2,1 |
| Dark Magenta | 1,0,-1 | -1,2,-1 | 1,2,-1 | -1,0,1 | 1,0,1 | -1,2,1 | 2,4,2 |
| Dark Cyan | 2,-1,-1 | 0,1,-1 | 2,1,-1 | 0,-1,1 | 2,-1,1 | 0,1,1 | 4,3,2 |
| Grey | 1,-1,-1 | -1,1,-1 | 1,1,-1 | -1,-1,1 | 1,-1,1 | 0,1,1 | 2,3,3 |
| Red | 0,0,0 | -2,2,0 | 0,2,0 | -2,0,2 | 0,0,2 | -2,2,2 | 1,2,2 |
| Green | 2,-2,0 | 0,0,0 | 2,0,0 | 0,-2,2 | 2,-2,2 | 0,0,2 | 2,1,2 |
| Yellow | 0,-2,0 | -2,0,0 | 0,0,0 | -2,-2,2 | 0,-2,2 | -2,0,2 | 1,1,2 |
| Blue | 2,0,-2 | 0,2,-2 | 2,2,-2 | 0,0,0 | 2,0,0 | 0,2,0 | 2,2,1 |
| Magenta | 0,0,-2 | -2,2,-2 | 0,2,-2 | -2,0,0 | 0,0,0 | -2,2,0 | 1,3,2 |
| Cyan | 2,-2,-2 | 0,0,-3 | 2,0,-2 | 0,-2,0 | 2,-2,0 | 0,0,0 | 3,2,1 |
| White | 0,-2,-2 | -2,0,-2 | 0,0,-2 | -2,-2,0 | 0,-2,0 | -2,0,0 | 0,0,0 |

Figure 7A

| X | 76, 106, 56 | |
|---|---|---|
| 64, 122, 94 | 36, 68, 139 | |
| | | |

Gray/D. Cyan = -1, 0, 0

Figure 7B

| X | X | 21, 163, 27 |
|---|---|---|
| 60, 128, 84 | 30, 77, 123 | -1, 82, 172 |
| | | |

Green/Gray = 1, -1, 1

Figure 7C

| X | X | X |
|---|---|---|
| | 34, 78, 128 | 15, 85, 193 |
| | | |

Cyan/Green = 0, 0, -3

Figure 7D

| X | X | X |
|---|---|---|
| | 41, 46, 119 | X |
| | 72, 101, 47 | 58, 43, 39 |

D. Cyan/Gray = 1, 0, 0
D. Cyan/Cyan = 0, 1, 1

Figure 7E

| X | X | X |
|---|---|---|
| 78, 114, 89 | X | X |
| 52, 118, 63 | 92, 85, 53 | |

Gray/D. Cyan = -1, 0, 0
Gray/D. Cyan = -1, 0, 0

Figure 7F

| X | X | X |
|---|---|---|
| X | X | X |
| 38, 149, 48 | 89, 92, 49 | |

Green/Gray = 1, -1, 1

Figure 7G

| X | X | X |
|---|---|---|
| X | X | X |
| X | 126, 82, 96 | |

Gray/D. Cyan = -1, 0, 0
Gray/Green = -1, 1, -1

Figure 7H

| X | X | X |
|---|---|---|
| X | X | X |
| X | X | 89, 48, -27 |

D. Yellow/Cyan  =  -1, 1, 3
D. Yellow/Gray  =  0, 0, 1

Figure 8 Error Vectors

| 48, 43, -21 | -20, 30, -52 | 20, 4, 26 |
|---|---|---|
| -17, 38, -19 | 40, -32, 12 | 15, -73, -20 |
| 37, -10, 47 | 31, 5, -11 | -6, -31, 0 |

SYSTEM AND METHOD FOR DISPLAYING A COLOR IMAGE USING VECTOR ERROR DIFFUSION

TECHNICAL FIELD

This invention relates generally to a computer system and method for displaying a color image on a computer display device, and more particularly, to a method and system for displaying the color image using vector error diffusion.

BACKGROUND OF THE INVENTION

Computer systems output data in either monochrome or color formats. In certain applications, the display of data in color has many advantages over the monochrome display of data. The use of color allows for easy identification of certain data on a display. For example, a red field could mean data entered incorrectly, whereas a green field could mean data entered correctly. The use of colors also allows sophisticated multicolor graphs, charts, and diagrams to be displayed and printed. Finally, the use of color in an application has a particular aesthetic appeal to computer users that is similar to the appeal color television has over black-and-white television.

Computer systems typically support a variety of color output devices, including video displays and printers. Each of these output devices has differing characteristics. For example, the IBM 8514/A graphics adapter, which provides, an interface between the computer and the display, provides the capability to display over 256,000 colors, but only 256, different colors can be displayed at one time. The IBM Enhanced Graphics Adapter (EGA) can display 64 colors, but only 16 different colors can be displayed at a time. When using these adapters, the program sending data to the adapter must specify which colors are the "active" colors; that is, the colors that currently are selected for display. Some other display devices, such as inkjet color printers, are capable of displaying only 16 colors, all of which are active.

Each application program that displays color data must account for the differences in the number of active colors the various graphics adapters support. Systems software, such as Microsoft's Windows, provides a device-independent application programming interface. A developer of application programs can use standard systems routines to display information on a color output device. The systems software adjusts the data to accommodate the differing characteristics of the graphics adapter, so the application programmer need not be concerned about the differing characteristics of the graphics adapters.

The visible spectrum of color can be characterized as a three-dimensional color space. Each color of the visible spectrum can be characterized as a three-dimensional color vector in a color coordinate system, such as the RGB red-green-blue) system typically used in the United States or the CIE (Commission Internationale de l'Eclairage) system typically used in Europe. Each color vector includes a color intensity value for each of the three color coordinates in the color coordinate system. In the RGB system, each color vector includes a color intensity value for each of the red, green, and blue color coordinates, while in the CIE system, the color components are referred to simply as X, Y, and Z.

Color output devices display the active colors using combinations of base colors. The base colors may or may not be the same as the color coordinates of the color coordinate system being used. The color coordinates refer to the colors used in the color coordinate system to internally represent an image; the base colors refer to the colors used to display the image using an output device. Color monitors typically employ red, green, and blue phosphor colors as the base colors and color printers typically use cyan, yellow, and magenta inks as the base colors. Each picture element (pel) on a display can be set to any one of the active colors by setting appropriate color intensity values for the base colors being used. For example, a low-intensity red value would appear as dim red and a high-intensity red value would appear as bright red. The IBM 8514/A can display 64 different color intensity values of each base color, but the IBM EGA can display only two different color intensity values for each base color.

The IBM 8514/A has 256 active colors selected from the 256,000 colors that it can display. Each active color can be represented in binary form using 8 bits. Each pel has associated with it an 8-bit value representing the active color to be displayed at that pel. By standard programming convention, the 8 bits are divided into 3 bits for red, 3 bits for green, and 2 bits for blue. Thus, eight different intensities of red and green are active, but only four intensities of blue are active. The IBM EGA has only 16 active colors. Thus, each pel has an associated 4-bit value. By standard programming convention, there is one red bit, one green bit, one blue bit, and one intensity bit (IBGR). The intensity bit selects either high or low intensity for all the colors. Thus, the three colors of a given pel can be displayed either in all high intensity or in all low intensity.

The device-independent application program interfaces provided by systems software can support a much larger number of active colors than is typically supported by graphics adapters that are used on personal computers. For example, the Microsoft Windows pro tram supports over 16 million active colors. An application program using Windows can specify 8 bits of red, 8 bits of green, and 8 bits of blue. Each 8-bit value represents an intensity level of the color between 0 and 255. To display bright red at a pel, the application would select an RGB value of high-intensity red and zero intensity green and blue, which is represented as (255,0,0). To display half intensity magenta (purple), the application may select an RGB value of (128,0,128), that is, half-intensity red and blue and zero intensity green.

The systems software maps the 8-bit values specified by the application program to the active colors of the output device. This is referred to as gamut mapping because the gamut of colors specified by the application program is mapped to the gamut of active colors of the output device. In computer systems using the IBM 8514/A, the systems software maps the three 8-bit values to one 8-bit value and for systems using the IBM EGA, it maps to one 4-bit value.

This mapping results in undesirable effects. An application may specify similar shades of a color using the three 8-bit values. However, the systems software may map the similar, but not identical, shades to the same active color. For example, the systems software maps the 256 possible intensity levels for green and blue to just 8 intensity levels for the IBM 8514/A. Thus, typically 32 different application-specified intensities are actually displayed at the same intensity.

Prior art systems attempt to overcome the color inaccuracy of individual pixels using two methods borrowed from black and white graphics: halftoning and error diffusion. Both halftoning and error diffusion (also known as types of dithering) are based on the physiological phenomenon of the human eye known as spatial averaging or spatial integration. Spatial averaging results from the inability of the human eye to differentiate individual pixels because they are too small. As a result of spatial averaging, humans perceive the average effect of a group of pixels. For example, a group of alternating black and white pixels would appear to be gray.

In prior art black and white systems employing error diffusion, the luminance value of each pixel in succession of an input image is compared with the luminance values that can be produced by the display device. The displayable luminance value that is closest to the input luminance value is displayed and the difference (i.e. the error) between the input luminance value and the displayed luminance value is diffused to adjacent pixels. Typically, the prior art systems employ a method known as the Floyd-Steinberg algorithm, which diffuses the error to pixels adjacent the current pixel by adding $7/16$ of the error to the pixel to the right of the current pixel, $3/16$ to the pixel below and to the left, $5/16$ to the pixel immediately below and $1/16$ to the pixel below and to the right.

In prior art color systems, error diffusion is applied to create a desired average color of a group of pixels. In these prior art color systems, an input image, represented by a two-dimensional array of color vector triplets (such as RGB vector triplets), is divided into three two-dimensional arrays of scalars (color planes) and each color plane is treated separately. In other words, the prior art systems employ error diffusion on three separate color planes or images, with each color plane consisting of one component (base color) of the color triplet. The three resultant images are then superimposed when they are output.

This prior art error diffusion process assumes the axis of the output device's color space is lined up with the axis of the image's color space (e.g., specifying pure red causes the device to output the purest red of which it is capable). Also, it assumes the interaction between the colorants in the three planes is accurately described by a linear relationship (i.e., ColorOf(M+N)=ColorOf(M)+ColorOf(N)). Furthermore, it assumes a linear relationship as the amount of a particular color is varied. ColorOf(c*M)=c*ColorOf(M). It is evident from looking at the inaccurate results of conventional color error diffusion as implemented in color printers, that these assumptions are not valid.

SUMMARY OF THE INVENTION

The invention is directed to a method and system for displaying a color image with a display device using vector error diffusion. Each pixel of the color image is represented by a color vector which typically is an RGB (red, green, blue) triplet in the RGB color space. Each display device can display a set of active colors, with each active color being represented by one of the color vectors. Often, the display device cannot display the exact color vector desired, so it displays the closest active color to the desired color, thereby resulting in an error vector for each pixel. The invention computes the error vector by vector subtracting the color vector of the active color displayed from the color vector desired. The computed error vector is diffused to adjacent pixels by adjusting the color vectors of the adjacent pixels by fractions of the computed error value. Preferably, the invention characterizes each active color that can be displayed on the display device by measuring the active color directly using a colorimeter. The direct measurement eliminates errors caused by non-linear combinations of the color coordinates of the color vectors and allows the invention to display an image that is a more accurate representation of the desired image.

In a preferred embodiment, the invention also adjusts the desired color vector for each pixel to compensate for color bleeding between pixels. In this preferred embodiment, the invention characterizes a bleeding value for each possible combination of active colors. Each bleeding value refers to the color change occurring for a target pixel for a specific active color when another active color is positioned adjacent the target pixel. The bleeding valve modifies the color vector of the active color when it is positioned adjacent the other colors. Thus, the bleeding value is used when determining which active color to display and when determining the error vector to diffuse to adjacent pixels.

BRIEF DESCRIPTION OF THE DRAWINGS

FIG. 3 is an active color table used according to the present invention.

FIG. 4A is part A of a color bleeding table used according to the present invention.

FIG. 4B is part B of the color bleeding table used according to the present invention.

FIG. 5 is an exemplary input image array acted upon by the present invention.

FIG. 6 is an output image array resulting from employing the invention on the input image array of FIG. 5.

FIGS. 7A–7H depict intermediate vectors of the input image array shown in FIG. 5 upon being acted upon by the present invention.

FIG. 8 is an array of error vectors produced according to the present invention for the input image array shown in FIG. 5.

DETAILED DESCRIPTION OF THE INVENTION

The invention is directed to a method and system for displaying a color image with a display device using vector error diffusion. Each pixel of the color image is represented by a color vector, which typically is an RGB (red, green, blue) triplet. Each display device can display a set of active colors, with each active color being represented by one of the color vectors. Often, the display device cannot display the exact color vector desired, so it displays the closest active color to the desired color, thereby resulting in an error vector for each pixel. The invention computes the error vector by vector subtracting the color vector of the active color displayed from the color vector desired. The computed error vector is diffused to adjacent pixels by adjusting the color vectors of the adjacent pixels by fractions of the computed error value. Preferably, the invention characterizes each active color that can be displayed on the display device by measuring the active color directly using a colorimeter. The direct measurement eliminates errors caused by non-linear combinations of the color coordinates of the color vectors. The direct measurement also compensates for base colors that are not coincident to the axes of the color coordinate system being used.

In a preferred embodiment, the invention also adjusts the desired color vector for each pixel to compensate for color bleeding between pixels. In this preferred embodiment, the invention characterizes a bleeding value for each possible combination of active colors. Each bleeding value refers to the color change occurring for a target pixel for a specific active color when another active color is positioned adjacent the target pixel. The bleeding value is used to modify the color vector of the active color when it is positioned adjacent the other colors. Thus, the bleeding value is used when determining which active color to display and when determining the error vector to diffuse to adjacent pixels.

By using vector error diffusion, the present invention provides a more accurate color image display than is possible using prior art scalar systems. By characterizing the color vectors of the actual active colors displayed, the invention eliminates the errors of prior art systems caused by non-linear addition of scalar color values (i.e., ColorOf(M+N)≠ColorOf(M)+ColorOf(N)). Further, by characterizing and adjusting for bleeding vectors, the invention eliminates the errors of prior art systems caused by color bleeding between pixels.

Figure 1:
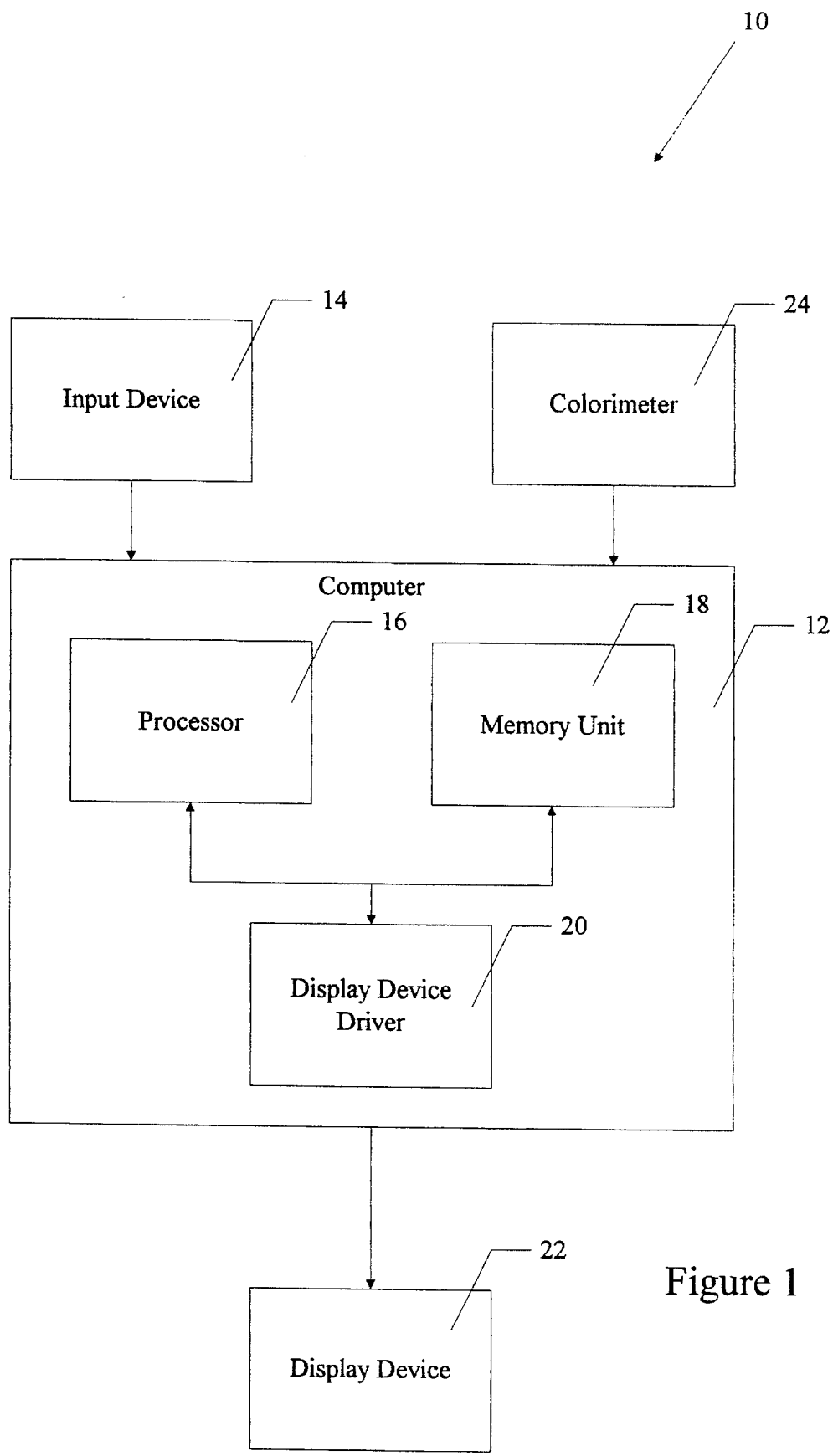
FIG. 1 is a block diagram of a computer system for displaying a color image according to the present invention.

Shown in FIG. 1 is a system 10 for displaying a color image using vector error diffusion according to the present invention. The system 10 includes a computer 12 coupled to an input device 14 for inputting image data into the computer. The input device 14 can include a conventional digital scanner that is used to create a digital image representative of an original image such as a photograph or painting. The input device 14 can also include other image creation devices such as a keyboard, mouse, or other pointing device for creating original digital images in conjunction with appropriate application software. Further, the input device 14 can include digital transmission devices such as a network connection or a floppy disk drive to input previously made digital images.

The computer 12 can be implemented using any conventional computer, such as a personal computer. The computer 12 includes a processor 16 operated in accordance with conventional operating system software, such as Microsoft Windows. Coupled to the processor 15 is a memory unit 18 that includes such conventional memory as random access memory (RAM), floppy disk drives, hard disk drive, and CD ROM drives. The computer 12 also includes a display device driver 20 coupled to the processor 16 and memory unit 18 to enable images to be displayed on a display device 22 coupled to the computer. The display device can be any device for displaying color images such as a color cathode ray tube (CRT) monitor and a color printer.

The computer system 10 also includes a colorimeter 24 coupled to the computer 12. The colorimeter 24 is a conventional device that measures the amount of each color coordinate of a color vector representing a displayed color. For example, when using the RGB color coordinate system, the colorimeter 24 measures the amount of red, green, and blue in the RGB color vector representing the displayed color. A more detailed description of colorimeters can be found on pages 243–248, Wyszecki et al., "Color Science: Concepts and Methods, Quantitative Data and Formulae," published in 1982 and incorporated herein by reference in its entirety.

Figure 2:
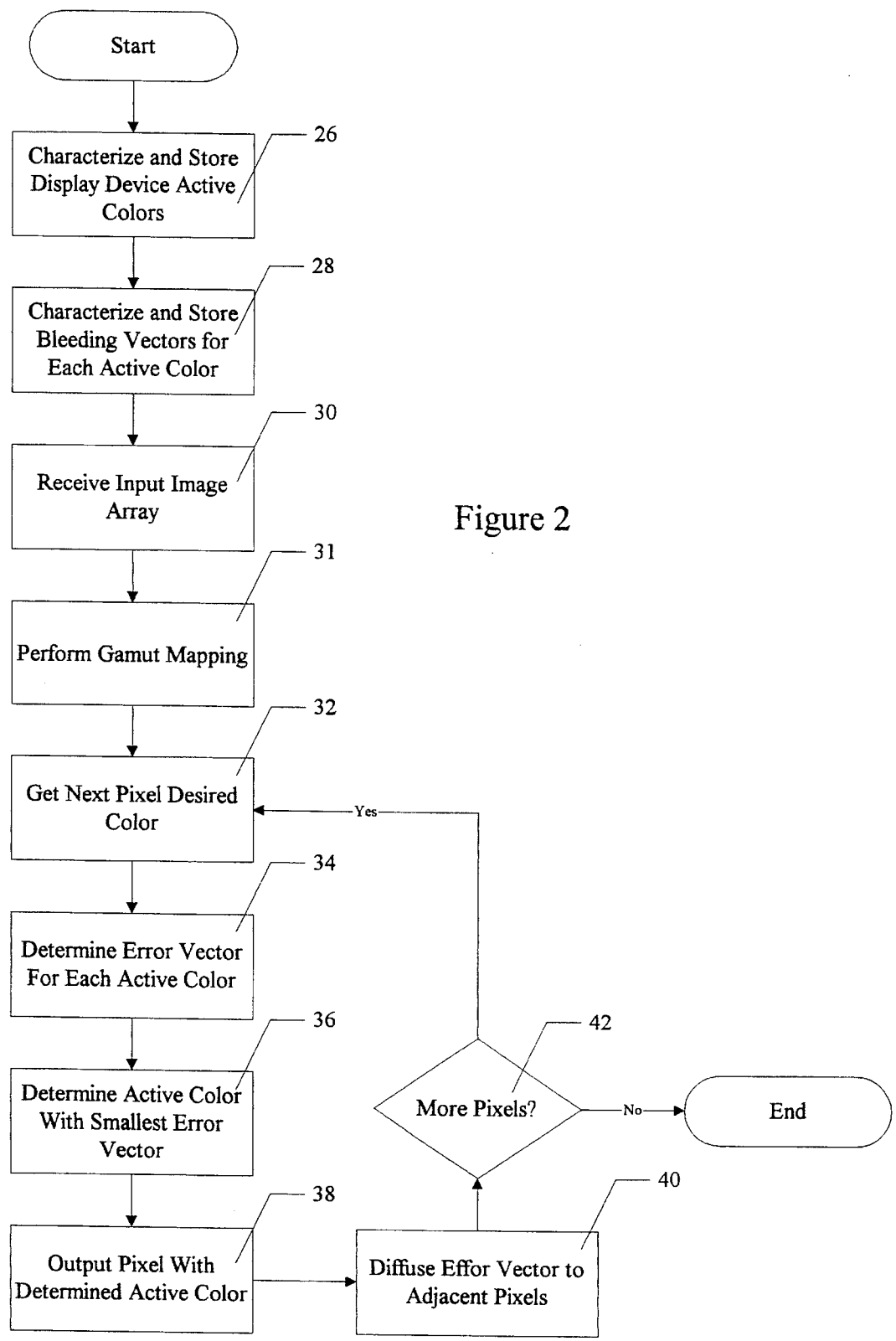
FIG. 2 is a flow diagram of a method for displaying a color image according to the present invention.

Shown in FIG. 2 is a flow diagram of a preferred method for displaying a color image using vector error diffusion. In step 26, the method characterizes the active colors of the display device 22 using the colorimeter 24 and stores the characterized colors in an active color table in the memory unit 18. The active colors are characterized simply by displaying them on the display device 22 and using the colorimeter to measure the color intensity values of the color coordinates comprising each active color. The characterized values are stored as an active color table for subsequent use by the method in determining the error vectors for an image to be displayed, as discussed in detail below.

An example of an active color table is shown in FIG. 3, which shows for each active color an RGB color vector measured for that active color and an IBGR color identification. Each value of the RGB color vector corresponds to the color intensity of one of the red, green, and blue color coordinates on an intensity scale from 0 to 255. For example, when the IBGR color 0101 (dark magenta) is displayed on an IBM EGA display device, the measured RGB color vector may be a 98 intensity for red, a 0 intensity for green, and a 107 intensity for blue. It will be appreciated that the measured color intensity values of the RGB color vectors typically do not equal optimal values. For example, the measured color vector for black in FIG. 3 is a 0, 0, 0 color vector that would be the darkest black in the RGB color space, but often the background is less than pure black, such as a color vector of 8, 12, 18. Further, the base colors used to display an image often are not coincident with the axes of the color coordinate system such that the active color for dark red might include non-zero intensity values for the green and blue color coordinates.

If the output device being used results in color bleeding, then the change in color produced by adding a target pixel of a particular color depends on the colors of the surrounding pixels. The magnitude of an existing pixel's effect on the color change is directly related to the proximity of the existing pixel to the target pixel being added. A computation of effective color change produced by each active color in the presence of every possible combination of surrounding pixel colors is possible, but impractical. Where bleeding is less severe, only the existing pixels closely adjacent to the target pixels need be considered. If the bleeding is relatively minor, only the existing pixels above and to the left or right of the target pixel need be considered. Further, when the bleeding is minor, one can assume that the effect of each existing pixel is linearly independent of the effect of the other existing pixels.

Returning to FIG. 2, the method characterizes bleeding vectors for each active color and stores the bleeding vectors in a bleeding vector table in the memory unit 18. Each bleeding vector corresponds to the change in color of a target pixel when an adjacent pixel is displayed with one of the active colors and thus is a measure of the amount of color that bleeds from the adjacent pixel into the target pixel. For example, FIGS. 4A and 4B show a color bleeding table which includes a color bleeding vector entry for each possible combination of the active colors listed in the active color table of FIG. 3. The use of the color bleeding table to determine the active color to be displayed and to determine the error vector to be diffused is discussed in more detail below.

Because the bleeding vectors represent color changes, they are not directly measurable by a colorimeter and are computed indirectly. For example, to calculate the effect on a target pixel of color E of adding an adjacent pixel of color B in the same column, the invention preferably uses the following technique, where the dots represent blank pixels.

let $V_w$=color measurement of white paper let $V_e$=color measurement of paper with the following pattern:
E.E.E.E.
........
E.E.E.E.
........

let $V_b$=color measurement of paper with the following pattern:

B.B.B.B.

........

B.B.B.B.

........

let $V_{be}$=color measurement of paper with the following pattern:
B.B.B.B.
E.E.E.E.
B.B.B.B.
E.E.E.E.

define $D_e$=Vw−Ve=Color of E pixels without color of paper define $D_b$=Vw−Vb=Color of B pixels without color of paper define $D_{be}$=Vw−Vbe=Color of B & E pixels without color of paper The effective color of the E colored pixels in the presence of the B color pixels is DpureE (presence of B)=$2(D_e-D_b+D_{be})$ (multiplied by 2 because only half of the pixels in the last pattern are colored). The color change that would occur by adding pixels of color E at all positions in the patterns shown above is $4D_e$. As a result, the bleeding effect on the E colored pixels due to the B colored pixels (i.e., the bleeding vector) is:

$$4D_e-[2(D_e-D_b+D_{be})]=2(D_e+D_b-D_{be})=B_{be} \quad \text{Equation 1}$$

Similarly, the bleeding effect on the E colored target pixels of adding D colored adjacent pixel in the same row is:

$$2(D_e+D_f-D_{fe})=B_{fe} \quad \text{Equation 2}$$

The vector $D_f$ is obtained from a color measurement of the pattern
F.F.F.F.

........

F.F.F.F.

........

and the vector $D_{fe}$ is obtained from a color measurement of paper with the pattern

........

FEFEFEFE

........

FEFEFEFE

Of course, similar calculations can be made for a CRT monitor display device except that the color changes would be calculated with respect to a black background rather than a white paper background. For example, the value $D_e$ would equal $V_k$ plus $V_e$ where $V_k$ is a color measurement of the black CRT monitor background. Further, if the black background often has a color measurement $V_k$ of 0, 0, 0, the $V_k$ often can be ignored in the calculation of the bleeding vectors.

It should be appreciated that the step of characterizing the color vectors of the active colors (step 26) and the step of characterizing bleeding vectors (step 28) need only be performed once for each output device. Alternatively, where the background of the output device changes, such as using different paper colors with a color printer, steps 26 and 28 can be repeated for each background.

Returning to the method shown in FIG. 2 in step 30, the computer 12 receives an input image array, such as the one shown in FIG. 5, from the input device 14. The input image array is an array of color vectors for an array of pixels with each pixel being represented by a corresponding color vector. Each color vector includes a color intensity value for each color coordinate of the color coordinate system being used. Typically, color vectors of the input image array are represented using 8 bits for each color coordinates, that is, each color coordinate has a color intensity value ranging from 0 to 255.

As noted above, output devices typically cannot display colors across the entire 0 to 255 color gamut of the input image. That is, the output device has a color gamut or range of displayable colors that is smaller than the input image gamut. For example, the output device may only be able to display reds with intensity values from 10 to 190, greens with intensity values from 14 to 150, and blues with intensity values from 18 to 185. As a result, in step 31 the method performs gamut mapping, which maps the image gamut to the output device gamut. Gamut mapping is a well-known process and is described in more detail in Foley et al., "Computer Graphics," 1990, pp. 584–599, which is incorporated by reference herein in its entirety. For simplicity, the input image array shown in FIG. 5 is assumed to have already been mapped into the output device gamut.

In step 32, the method obtains the desired color of the next pixel, which is the first pixel of the input image array (pixel A1 in FIG. 5) during the first time through the flow diagram of FIG. 2. In step 34, the method determines an error vector for each active color of the display device 22. The error vector for each active color is determined in step 34 by subtracting the color vector for each active color from the desired color vector for the first pixel of the input image array. The error vectors determined in step 34 are used to determine which active color results in the smallest error vector in step 36. The smallest error vector is determined by computing the sum of the squares of the values of the color coordinates resulting from the subtraction performed in step 34. In step 38, the method outputs the first pixel with the closest active color determined in step 36. When using a CRT monitor as the output device, the base colors being displayed are red, green, and blue phosphor colors, which are the same colors as the RGB color coordinates being used in this example. However, when using a color printer as the output device, the base colors typically are cyan, yellow, and magenta ink colors. Because the colorimeter has measured the RGB color vectors corresponding to the CYM color vectors, the RGB color vectors for the active color to the CYM ink colors is automatic.

In step 40, the method adjusts the desired colors of adjacent image pixels based on the error vector determined in step 34 for the closest active color, which was output in step 38 (see pixel A1 of the output image array of FIG. 6). In a preferred embodiment, the error vectors are diffused into adjacent pixels according to the weighting system specified by the Floyd-Steinberg algorithm used for black and white images. That is, $7/16$ of the error vector is added to the desired color value of the pixel immediately to the right of the current pixel, $3/16$ of the error vector is added to the pixel below and to the left of the current pixel, $5/16$ of the error vector is added to the pixel below the current pixel, and $1/16$ of the error vector is added to the pixel below and to the right of the current pixel. A more complete discussion of the Floyd-Steinberg algorithm with respect to black and white images can be found on pages 572–573 of the Foley et al. book referenced above. Alternatively, numerous other prior art error diffusion weighting systems can be employed and the error vectors can be diffused into pixels less closely positioned with respect to the current pixel.

In step 42, the method determines whether there are more pixels of the input image array to be analyzed. If so, then steps 32–40 are repeated for the next pixel. For each pixel subsequent to the first pixel, the desired color obtained in step 32 is the original desired color for the input image adjusted by one or more previous error vectors for adjacent pixels as performed in step 40 of previous loops of the method shown in FIG. 2. In addition, the error vector determined for each active color in step 34 is adjusted by the bleeding vectors taken from the bleeding vector table stored in step 28.

An example may be helpful to provide a more thorough understanding of the preferred embodiment of the invention discussed with respect to the flow diagram of FIG. 2. Shown in FIG. 3 is an example of an active color table produced according to step 26 of FIG. 2. The first column of the active color table lists the active colors displayable by the display device being used. The second column lists the color vectors measured by the colorimeter 24 (FIG. 1) for the active colors. In this example, the color vectors are RGB color vectors, which indicate the intensity of each of the red, green, and blue base colors, respectively. The third column lists the IBGR color vectors used to represent the active colors, wherein the bits of the IBGR color vectors represent an intensity level, a blue level, a green level, and a red label, respectively. It should be appreciated that the active color table shown in FIG. 3 is only exemplary, and numerous other active colors and color coordinate systems could be used by the present invention.

It can be appreciated from the active color table of FIG. 3 that the combination of color coordinates forming the active colors is non-linear. For example, the dark red active color has an RGB color vector red component of 100 and the dark green active color has an RGB color vector green component of 80. However, when dark red and dark green are combined to create dark yellow, the dark yellow has a red component of 96 and a green component of 78. This non-linearity leads to color errors in prior art systems, which erroneously assume linear combinations of color.

Shown in FIGS. 4A and 4B is a color bleeding table produced according to step 28 of the flow diagram shown in FIG. 2. The color bleeding table stores a color bleeding vector for each possible combination of active colors. Each error vector shown represents the color coordinate values to be added to the active color at the beginning of the row to produce an effective color for a current pixel in question. For example, a dark green pixel would bleed into an adjacent dark red pixel by the amount specified by the color bleeding vector −1, 3, 0, which can be found at the intersection of the dark red row with the dark green column. It can be appreciated that the effect of a color on another is not equal for all colors. For example, a dark red added to black produces a bleeding vector of 1, 0, 0, while dark red added to white produces a bleeding vector of −1, −2, −1.

FIG. 5 shows an example of an input image array that is received in step 30 and gamut mapped in step 31 of the flow diagram shown in FIG. 2. Each field in the input image array contains a color vector, which in this example is an RGB color vector. Each color vector of the input image array represents a desired color for the pixel associated with that color vector.

In step 32 of FIG. 2, the invention obtains the desired color of the next pixel which begins with the pixel associated with the RGB color vector 48, 120, 85 shown in the first field of the input image array of FIG. 5. The method determines an error vector for each of the active colors by subtracting the RGB color vector for each active color from the desired color vector 48, 120, 85. For example, the error vector for dark cyan equals 48, 43, −21 (48 minus 0, 120 minus 77, 85 minus 106) (step 34). The method determines the closest active color to the desired color by calculating the active color with the smallest error vector magnitude which equals the square root of the sum of the squares of the color coordinate values of the error vector. For example, the error vector 48, 43, −21 for dark cyan has a magnitude of:

$$\sqrt{48^2 + 43^2 + (-21)^2}$$

In the current example, the magnitude of the error vector for dark cyan is smallest, so the method outputs a dark cyan pixel as the first pixel to be displayed.

In the preferred embodiment, the error vector is diffused to adjacent pixels according to the Floyd-Steinberg weighting algorithm (step 40). Returning to the example, the error vector 48, 43, −21 for the dark cyan first pixel (A1) is diffused to the pixel (A2) to the right of the first pixel by multiplying the error vector by $7/16$ and adding the result to the desired color vector of the pixel to the right of the first pixel ($7/16$ * 48, 43, −21+55, 87, 65=76, 106, 56). The error vector is diffused to the pixel below (B1), the first pixel (A1) by multiplying the error vector by $8/16$ and adding it to the desired color vector for the pixel below the first pixel for a new desired color vector of 64, 122, 94. The error vector is multiplied by $8/16$ rather than $5/16$ because there is no pixel below and to the left of the first pixel so the missing $3/16$ is added to the $5/16$ to obtain the $8/16$ weighting factor. FIG. 7A shows the new desired color vectors resulting from diffusion of the error vector computed for the first pixel.

The process for determining the closest active color and the error vector for the next pixel (pixel A2) differs slightly from the process described above for the first pixel (pixel A1). The error vector for each active color is determined by subtracting the RGB color vector for the active color from the new desired color vector for the A2 pixel (as adjusted based on the error vector for the first pixel A1) plus the appropriate color bleeding vector from the color bleeding table of FIGS. 4A and 4B. For example, the error vector for the active color gray equals (76, 106, 56)−(97, 76, 108)+(−1, 0, 0), which equals (−20, 30, −52). Note that the bleeding vector −1, 0, 0 is located in the field at the intersection of the gray row and the dark cyan column. It will be appreciated that the error vector for the active color gray has the smallest magnitude, so the method outputs a gray pixel as the second pixel (A2). The gray error vector (−20, 30, −52) is diffused to the adjacent pixels according to the Floyd-Steinberg weighting algorithm resulting in the new color vector shown in FIG. 7B.

FIGS. 7C–7H show the new color vectors for each pixel as adjusted by the error vectors of subsequent pixels. FIG. 7C–7H also show the appropriate bleeding values for the active colors output for the associated pixels. It should be appreciated that at the end of each row, the direction of error diffusion is reversed in the preferred embodiment. FIG. 8 is a table of the error vectors for the active colors output by the preferred method, which are shown in the output image array of FIG. 6.

By treating the color of each pixel of an input image as a color vector rather than a combination of color scalars as done in prior art systems, the invention provides an output image that is closer to the input image than is provided by the prior art systems. For example, the prior art systems would divide the input image array shown in FIG. 5 into three separate color images as shown below in Tables 1–3: one red image, one blue image, and one green image.

TABLE 1

| 48 | 55 | 30 |
|----|----|----|
| 40 | 33 | 0  |
| 50 | 72 | 50 |

TABLE 2

| 120 | 87  | 150 |
|-----|-----|-----|
| 100 | 66  | 80  |
| 120 | 105 | 80  |

TABLE 3

| 85  | 65  | 50  |
|-----|-----|-----|
| 105 | 140 | 175 |
| 62  | 48  | 48  |

Rather than measuring the actual color vectors displayed, the prior art systems assume that the output device is perfect, that is, the prior art systems assume that the output device can output intensity values of 0, 127, and 255 for each color coordinate. For the first pixel, the 48 of the red image is compared to the three possible red levels: 0, 127, and 255. The 48 is closest to 0, so no red is output for the first pixel. Similarly, the 120 of green image is closest to the displayable green level of 127 (out of 0, 127, and 255) and the 85 of the blue image is closest to the displayable blue value of 127. As a result, the prior art system outputs 0 red, 127 green, and 127 blue, which will appear as dark cyan when the three color images are superimposed (the actual color output is the 0, 77, 106 RGB color vector). This is the same color as displayed for the first pixel by the present invention, but as shown below, the prior art system incorrectly outputs a dark yellow second pixel rather than the gray second pixel displayed by the present invention.

Rather than computing an error vector for the first pixel, the prior art computes three error scalar values. For the first pixel, the red error value is 48 (48–0), the green error value is –7 (120–127) and the blue error value is –42 (85–127). To diffuse the error, each error value is multiplied by 7/16 and the result is added to the desired color value for the second pixel. The error diffusions for the three color images results in red color value of 76 (55+21), a green color value of 84 (87–3), and a blue color value of 47 (65–18) for the second pixel of the respective color images. The closest color coordinate values to the 76, 84, and 47 are 127, 127, and 0 for the red, green, and blue color images, respectively. When the red, green, and blue color images are superimposed, the 127, 127, and 0 color values for the second pixel make the second pixel appear to be dark yellow. The dark yellow contrasts with the gray active color output for the second pixel according to the present invention (see pixel A2 of the output image array of FIG. 6).

The prior art scalar diffusion methods also suffer from an inability of some output devices to display some of the colors determined. For example, in the output color system described above, the output device can display the base colors in low intensity or high intensity, but not a mixture of low and high intensity. As a result, if the scalar diffusion on the red image requires a high intensity red for a current pixel and the scalar diffusion on the blue image requires a low intensity blue for the same current pixel, then that current pixel could not be displayed. The output device could not display high intensity red and low intensity blue for the same pixel.

As shown above, by using vector error diffusion, the present invention provides a more accurate color image display than is possible using prior art scalar systems. By characterizing the color vectors of the actual active colors displayed, the invention eliminates the errors of prior art systems caused by non-linear addition of scalar color values (i.e., ColorOf(M+N)≠ColorOf(M)+ColorOf(N)). Further, by characterizing and adjusting for bleeding vectors, the invention eliminates the errors of prior art systems caused by color bleeding between pixels.

It is to be understood that even though various embodiments and advantages of the present invention have been set forth in the foregoing description, the above disclosure is illustrative only, and changes may be made in detail, yet remain within the broad principles of the invention. Therefore, the present invention is to be limited only by the appended claims.

What is claimed is:

1. A computer-implemented method of producing a color image for a display device, the display device being capable of displaying plural active colors, each active color being represented by a color vector having a color intensity value for each of three color coordinates, comprising:

receiving an input array of pixels representing a desired image, each pixel of the input array having a desired color represented by a color vector having a color intensity value for each of the three color coordinates;

determining which active color is closest in color to the desired color of a first pixel of the input array;

determining an error vector corresponding to a difference between the desired color of the first pixel and the closest active color for the first pixel;

adjusting the desired color of a second pixel adjacent the first pixel based on the error vector;

determining a bleeding vector that reflects how much the closest active color of the first pixel bleeds onto the second pixel when the first and second pixels are displayed using the display device; and determining which active color is closest in color to the adjusted desired color of the second pixel based on the bleeding vector.

2. The method of claim 1 wherein the adjusting step includes adjusting the color intensity values of the desired color of the second pixel based on a weighted function of the error vector.

3. The method of claim 1, further including:

determining a new error vector corresponding to a difference between the adjusted desired color of the second pixel and the closest active color for the second pixel, the determining step including adjusting the difference based on the bleeding vector determined for the first pixel; and adjusting the desired color of a third pixel adjacent the second pixel based on the new error vector.

4. The method of claim 1, further including displaying with the display device the closest active color for the first pixel instead of the desired color for the first pixel.

5. The method of claim 1 wherein the step of determining the bleeding vector includes:

determining for each active color, a set of bleeding vectors, each bleeding vector reflecting a color change that occurs in a first test pixel colored with the active color when another active color from an adjacent second test pixel bleeds onto the first test pixel;

storing each set of bleeding vectors in a bleeding vector table;

accessing the bleeding vector for the closest active color for the second pixel that reflects the color change that occurs when the closest active color for the first pixel is adjacent the closest active color for the second pixel.

6. The method of claim 1 wherein each active color is displayed using a combination of four base colors.

7. The method of claim 1 wherein the error vector includes a difference value for each color coordinate, each difference value being determined by calculating the difference between the first pixel desired color's color intensity value for the color coordinate and the color intensity value of the same color coordinate of the active color.

8. The method of claim 1, further including:

characterizing each active color of the display device by measuring a color intensity value for each color coordinate of the active color;

storing the measured color intensity values for each active color; and using the stored color intensity values to determine error vectors for particular pixels.

9. The method of claim 1 wherein the display device includes a display surface and the step of determining a bleeding vector includes:

creating a bleeding vector table by steps that include, for each active color:

displaying on the display surface a first test pattern of pixels of the first active color without displaying; any pixels colored with an active color other than the first active color;

displaying on the display surface a second test pattern of pixels of a second active color without displaying any pixels colored with an active color other than the second active color;

displaying on the display surface a third test pattern of pixels of the first and second active colors without displaying any pixels colored with an active color other than the first and second active colors;

measuring with a colorimeter the color of each of the test patterns as displayed on the display surface;

measuring with the colorimeter the color of the display surface without any active colors being displayed;

determining a color change produced by each of the test patterns by determining the difference between the measured color of the display surface and the measured colors of each of the test patterns; and subtracting the color change produced by the third test pattern from the sum of the color changes produced by the first and second test patterns to obtain the bleeding vector of the first active color when adjacent the second active color; and accessing in the bleeding vector table the bleeding vector characterizing the color change that occurs when the active color is displayed adjacent the closest active color displayed for the first pixel.

10. A computer-implemented method for producing a color image for a display device, the display device being capable of displaying plural active colors, each active color being represented by a color vector having a color intensity value for each of color coordinate 1, color coordinate 2, and color coordinate 3, comprising:

storing an input array of pixels representing a desired image, each pixel of the input array having a desired color represented by a color vector having a color intensity value for each of the color coordinates;

determining which active color is closest in color to the desired color of a first pixel of the input array;

determining an error vector for the first pixel by:

determining a first difference between the color intensity value for the color coordinate 1 of the closest active color and the color intensity value for the color coordinate 1 of the desired color;

determining a second difference between the color intensity value for the color coordinate 2 of the closest active color and the color intensity value for the color coordinate 2 of the desired color; and determining a third difference between the color intensity value for the color coordinate 3 of the closest active color and the color intensity value for the color coordinate 3 of the desired color, wherein the error vector includes the first, second, and third differences; and adjusting the desired color of a second pixel adjacent the first pixel based on the error vector;

determining a bleeding vector that reflects how mush the closest active color of the first pixel bleeds onto the second pixel when the first and second pixels are displayed using the display device; and determining which active color is closest in color to the adjusted desired color of the second pixel based on the bleeding vector.

11. The method of claim 10 wherein the adjusting step includes adjusting the color intensity values of the desired color of the second pixel based on a weighted function of the error vector.

12. The method of claim 10, further including:

determining a new error vector corresponding to a difference between the adjusted desired color of the second pixel and the closest active color for the second pixel the determining step including adjusting the difference based on the bleeding vector determined for the first pixel; and adjusting the desired color of a third pixel adjacent the second pixel based on the new error vector.

13. The method of claim 10, further including displaying with the display device the closest active color for the first pixel.

14. The method of claim 10 wherein the step of determining the bleeding vector includes:

determining, for each active color, a set of bleeding vectors, each bleeding vector reflecting a color change that occurs in a first test pixel colored with the active color when another active color from an adjacent second test pixel bleeds onto the first test pixel;

storing each set of bleeding vectors in a bleeding vector table;

accessing the bleeding vector for the closest active color for the second pixel that reflects the color change that occurs when the closest active color for the first pixel is adjacent the closest active color for the second pixel.

15. The method of claim 10 wherein each active color is displaying using a combination of four base colors.

16. The method of claim 10, further including:

characterizing each active color of the display device by measuring a color intensity value for each of the color coordinates;

storing the measured color intensity values for each active color; and using the stored color intensity values to determine error vectors for particular pixels.

17. An apparatus for producing a color image for a display device, the display device being capable of displaying plural active colors, each active color being represented by a color vector having a color intensity value for each of three color coordinates, comprising:

a memory storing an input array of pixels representing a desired image, each pixel of the input array having a desired color represented by a color vector having a color intensity value for each of the color coordinates;

means for determining which active color is closest in color to the desired color of a first pixel of the input array;

means for determining an error vector corresponding to a difference between the desired color of the first pixel and the closest active color for the first pixel; and means for adjusting the desired color of a second pixel adjacent the first pixel based on the error vector, means for determining a bleeding vector that reflects how much the closest active color of the first pixel bleeds onto the second pixel when the first and second pixels are displayed using the display device; and means for determining which active color is closest in color to the adjusted desired color of the second pixel based on the bleeding vector.

18. The apparatus of claim 17 wherein the adjusting means includes means for adjusting the color intensity values of the desired color of the second pixel based on a weighted function of the error vector.

19. The apparatus of claim 17, further including:

means for determining a new error vector corresponding to a difference between the adjusted desired color of the second pixel and the closest active color for the second pixel, the determining mean including means for adjusting the difference based on the bleeding vector determined for the first pixel; and means for adjusting the desired color of a third pixel adjacent the second pixel based on the new error vector.

20. The apparatus of claim 17, further including:

the display device; and means for displaying with the display device the closest active color for the first pixel.

21. The apparatus of claim 17, further including:

a bleeding vector table stored in the memory, the bleeding vector table being made by steps that include, for each active color:

displaying the active color as a first active color in a first test pixel;

displaying a second active color in a second test pixel adjacent the first test pixel;

determining a color change in the first test pixel caused by the second active color bleeding onto the first test pixel;

characterizing the color change determined in the first test pixel as a bleeding vector for the active color; and repeating the displaying, determining, and characterizing steps for every combination of active colors as the first and second active colors;

wherein the means for determining the bleeding vector includes means for accessing the bleeding vector that reflects how much the closest active color of the first pixel bleeds onto the second pixel when the first and second pixels are displayed using the display device.

22. The apparatus of claim 17 wherein each active color is displayed using a combination of four base colors.

23. The apparatus of claim 17 wherein the error vector includes a difference value for each color coordinate, each difference value being determined by means for calculating the difference between the first pixel desired color's color intensity value for the color coordinate and the color intensity value of the same color coordinate of the active color.

24. The apparatus of claim 17, further including:

a colorimeter that characterizes each active color of the display device by measuring an intensity value for each color coordinate of the active color; and means for transmitting the measured intensity values for each active color in the memory for subsequent use in determining error vectors.

25. A computer-implemented method of producing a color image for a display device, the display device being capable of displaying plural active colors, each active color being represented by a color vector having a color intensity value for each of three color coordinates, the method comprising:

receiving an input array of pixels representing a desired image, each pixel of the input array having a desired color represented by color vector having a color intensity value for each of the three color coordinates;

determining which active color is closest in color to the desired color of a first pixel of the input array and displaying the closest active color in the first pixel;

determining which active color is closest in color to the desired color of a second pixel of the input array, the second pixel being adjacent the first pixel, the determining step including for each active color:

determining a bleeding vector characterizing the color change that occurs when the active color is displayed adjacent the closest active color displayed for the first pixel; and comparing the color vector of the active color with the color vector of the desired color and adjusting the comparison based on the bleeding vector accessed;

displaying in the second pixel the active color determined to be closest to the desired color of the second pixel.

26. The method of claim 25, further comprising:

determining an error vector corresponding to the difference between the desired color of the first pixel and the closest active color for the first pixel; and adjusting the desired color of the second pixel based on the error vector determined for the first pixel.

27. The method of claim 25, further comprising:

determining an error vector corresponding to a difference between the desired color of the second pixel and the closest active color for the second pixel, the difference being adjusted based on the error vector determined for the closest active color for the second pixel; and adjusting the desired color of a third pixel based on the error vector determined for the second pixel, the third pixel being adjacent the second pixel.

28. The method of claim 25, further including:

creating a bleeding vector table by steps that include, for each active color:

displaying the active color as a first active color in a first test pixel;

displaying a second active color in a second test pixel adjacent the first test pixel;

determining a color change in the first test pixel caused by the second active color bleeding onto the first test pixel;

characterizing the color change determined in the first test pixel as a bleeding vector for the active color; and repeating the displaying, determining, and characterizing steps for every combination of active colors as the first and second active colors; and wherein the step of determining a bleeding vector includes accessing the appropriate bleeding vector in the bleeding-vector table.

29. The method of claim 28 wherein the display device includes a display surface for displaying colored images and the step of determining a color change in the first test pixel caused by the second active color bleeding onto the first test pixel includes:

displaying on the display surface a first test pattern of pixels of the first active color without displaying any pixels colored with an active color other than the first active color;

displaying on the display surface a second test pattern of pixels of the second active color without displaying any pixels colored with an active color other than the second active color;

displaying on the display surface a third test pattern of pixels of the first and second active colors without displaying any pixels colored with an active color other than the first and second active colors;

measuring with a colorimeter the color of each of the test patterns as displayed on the display surface;

measuring with the colorimeter the color of the display surface without any active colors being displayed;

determining a color change produced by each of the test patterns by determining the difference between the measured color of the display surface and the measured colors of each of the test patterns; and subtracting the color change produced by the third test pattern from the sum of the color changes produced by the first and second test patterns to obtain the bleeding vector of the first active color when adjacent the second active color.

30. A computer-implemented method for selecting an active color to be displayed by a display device in a current pixel, the display device being capable of displaying plural active color, the current pixel being adjacent a previous pixel with a previous active color, each active color having a bleeding effect on the other active colors, comprising:

receiving an indication of a desired color to be displayed in the current pixel;

for each of the plurality of active colors, generating an indication of the visual similarity of the active color to the desired color based on the bleeding effect caused by the previous active color in the previous pixel bleeding onto the current pixel when the active color is in the current pixel; and identifying the active color that is most visually similar to the desired color as the selected active color based on the generated indication for each of the plurality of active colors.

31. The method of claim 30, further including:

determining an error vector corresponding to a difference between the identified active color and the desired color; and using the error vector to select the active color to be displayed on a next pixel that is adjacent the current pixel.

* * * * *

UNITED STATES PATENT AND TRADEMARK OFFICE
CERTIFICATE OF CORRECTION

PATENT NO. : 5,561,751
DATED : October 1, 1996
INVENTOR(S) : Peter W. Wong

It is certified that error appears in the above-indentified patent and that said Letters Patent is hereby corrected as shown below:

In column 13, claim 9, line 24, please delete ";".

In column 14, claim 10, line 15, please delete "mush" and insert therefor --much--.

In column 14, claim 12, line 29, following the second instance of "pixel" please insert --,--.

In column 15, claim 17, line 12, please delete "," and insert therefor --;--.

Signed and Sealed this

Eleventh Day of March, 1997

Attest:

BRUCE LEHMAN

*Attesting Officer*     *Commissioner of Patents and Trademarks*